United States Patent [19]

Heinz et al.

[11] Patent Number: 4,942,216

[45] Date of Patent: Jul. 17, 1990

[54] POLYARYL ETHER KETONES HAVING IMPROVED PROCESSIBILITY

[75] Inventors: Gerhard Heinz, Weisenheim; Robert R. Lieder, Limburgerhof; Juergen Koch, Neuhofen, all of Fed. Rep. of Germany

[73] Assignee: BASF Aktiengesellschaft, Ludwigshafen, Fed. Rep. of Germany

[21] Appl. No.: 308,525

[22] Filed: Feb. 10, 1989

[30] Foreign Application Priority Data

Feb. 11, 1988 [DE] Fed. Rep. of Germany ....... 3804159

[51] Int. Cl.$^5$ .......................... C08G 8/02; C08G 14/00
[52] U.S. Cl. ..................... 528/125; 528/126; 528/128; 528/174; 528/175; 525/471; 525/390
[58] Field of Search ............. 528/125, 126, 128, 174, 528/175; 525/471, 390

[56] References Cited

U.S. PATENT DOCUMENTS 4,268,650  5/1981  Rose ................................ 528/125

FOREIGN PATENT DOCUMENTS 184458  6/1986  European Pat. Off. ............ 528/125

*Primary Examiner*—John Kight, III
*Assistant Examiner*—M. L. Moore
*Attorney, Agent, or Firm*—Oblon, Spivak, McClelland, Maier & Neustadt

[57] ABSTRACT

Polyaryl ether ketones essentially consist of (A) 55-95 mol % of repeating units of the general formula

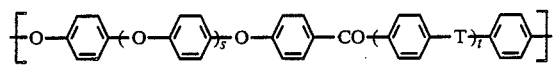

where s and t are each 0, 1, 2 or 3 and Q and T are each —O— or —CO—, or their $C_1$-$C_6$-alkyl, $C_1$-$C_6$alkoxy, aryl, chlorine or fluorine derivatives substituted in the nucleus, and (B) 5-45 mol % of repeating units of the general formula II

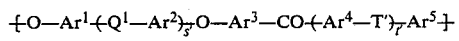

where $Ar^1$, $Ar^2$, $Ar^3$, $ar^4$ and $Ar^5$ independently of one another are each a phenylene, biphenylene or naphthylene group or a $C_1$-$C_6$-alkyl, $C_1$-$C_6$-alkoxy, aryl, chlorine or fluorine derivative of this group, Q' and T' are each —O—or —CO— and s' and t' are each 0, 1, 2 or 3, with the proviso that one or more of the groups $Ar^1$, $Ar^2$, $Ar^3$, $Ar^4$ and $Ar^5$ are a biphenylene or naphthylene group or a $C_1$-$C_6$-alkyl, $C_1$-$C_6$-alkoxy, aryl, chlorine or fluorine derivative of such a group and, if $Ar^1$ is a biphenylene group, all parameters s, t, s' and t' are not simultaneously 0.

8 Claims, No Drawings

POLYARYL ETHER KETONES HAVING IMPROVED PROCESSIBILITY

The present invention relates to polyaryl ether ketones essentially consisting of (A) 55-95 mol % of repeating units of the general formula I

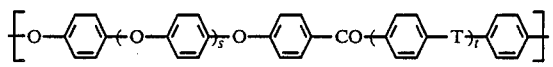

where s and t are each 0, 1, 2 or 3 and Q and T each —O— or —CO—, or their $C_1$–$C_6$-alkyl, $C_1$–$C_6$-alkoxy, aryl, chlorine or fluorine derivatives substituted in the nucleus, and (B) 5-45 mol % of repeating units of the general formula II

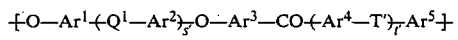

where $Ar^1$, $Ar^2$, $Ar^3$, $Ar^4$ and $Ar^5$ independently of one another are each a phenylene, biphenylene or naphthylene group or a $C_1$–$C_6$-alkyl, $C_1$–$C_6$-alkoxy, aryl, chlorine or fluorine derivative of this group, Q' and T' are each —O— or —CO— and s' and t' are each 0, 1, 2 or 3, with the proviso that one or more of the groups $Ar^1$, $Ar^2$, $Ar^3$, $Ar^4$ and $Ar^5$ are a biphenylene or naphthylene group or a $C_1$–$C_6$-alkyl, $C_1$–$C_6$-alkoxy, aryl, chlorine or fluorine derivative of such a group and, if $Ar^1$ is a biphenylene group, all parameters s, t, s' and t' are not simultaneously 0.

The present invention furthermore relates to the use of such polyaryl ether ketones for the production of moldings and substrates for electrical and electronic components, and the moldings and substrates obtainable from the polyaryl ether ketones and intended for the stated components.

Polyaryl ether ketones belong to the class consisting of the thermoplastics which are resistant to high temperatures. These have become increasingly important over the past few years owing to their interesting properties. Many polyaryl ether ketones can be used at high temperatures and have very good resistance to corrosive media.

One problem of the polyaryl ether ketones, however, is their processibility, since their high melting point makes it necessary for processing by a thermoplastic method via the melt to be carried out at very high temperatures, which on the one hand are expensive to realize industrially and on the other hand have the disadvantage that, under these conditions, the polyaryl ether ketones themselves are also more susceptible to external influences.

There is therefore a need for polyaryl ether ketones which, on the one hand, can be used at high temperatures but, on the other hand, can be processed on conventional processing machines via the melt.

In other words, it is desirable to have products which have a very high glass transition temperature in combination with a very low melting point.

EP-A 184 458 discloses aromatic polyether ketones which consist of repeating units derived from hydroquinone and 4,4'-difluorobenzophenone or 4,4'-dihydroxydiphenyl and 4,4'-difluorobenzophenone. The amount of the first-mentioned units is from 60 to 95 mol %, and the amount of the second units is from 5 to 40 mol %.

According to the Examples, the products have glass transition temperatures of from 143° to 160° C. and melting points of from 310° to 340° C.

For some intended uses, however, it is desirable to have products which have higher glass transition temperatures in combination with a melting point which is still acceptable.

It is an object of the present invention to provide polyaryl ether ketones having a very high glass transition temperature in combination with a very low melting point.

We have found that this object is achieved by the polyaryl ether ketones according to the invention.

The novel polyaryl ether ketones consist of from 55 to 95, preferably from 65 to 90, particularly preferably from 65 to 75, mol % of repeating units of the general formula I

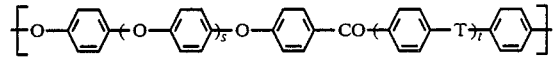

where s and t are each 0, 1, 2 or 3 and Q and T are each —O— or —CO—, or their $C_1$–$C_6$-alkyl, $C_1$–$C_6$-alkoxy, aryl, chlorine or fluorine derivatives substituted in the nucleus.

Preferred products are those having repeating units of the general formula

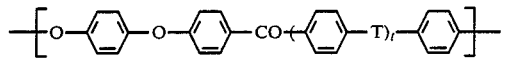

where the aromatic rings may be substituted by $C_1$–$C_6$-alkyl, $C_1$–$C_6$-alkoxy, aryl, chlorine or fluorine and T and t have the meanings stated in claim 1, as repeating units of the general formula I.

Other preferred products are those where, in the general formula I, both Q and T are —CO—.

s and t are each preferably 0 or 1.

Typical repeating units of the general formula I are those stated below:

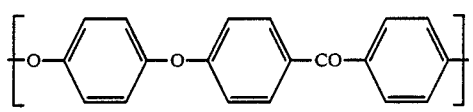

(I1)

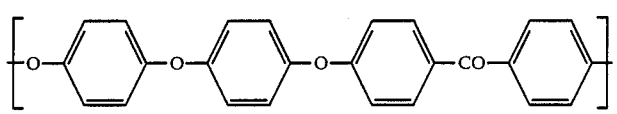

(I2)

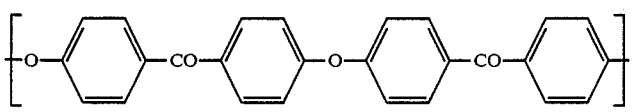
(I3)

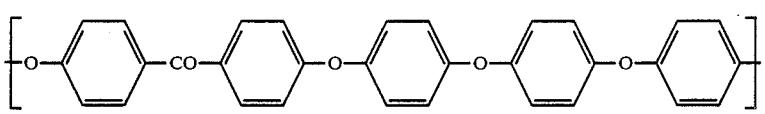
(I4)

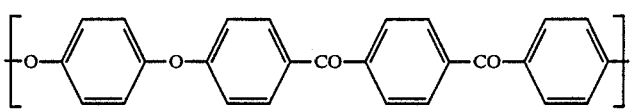
(I5)

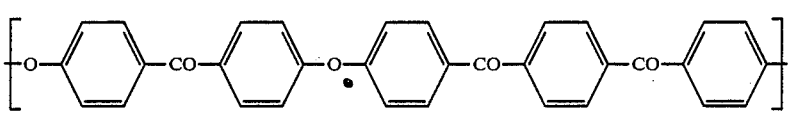
(I6)

In addition to the repeating units of the general formula I, the novel polyaryl ether ketones contain from 5 to 45, preferably from 10 to 35, in particular from 25 to 35, mol % of repeating units of the general formula II

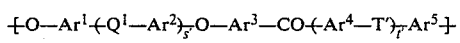

where $Ar^1$, $Ar^2$, $Ar^3$, $Ar^4$ and $Ar^5$ independently of one another are each a phenylene, biphenylene or naphthylene group or a $C_1$–$C_6$-alkyl, $C_1$–$C_6$-alkoxy, aryl, chlorine or fluorine derivative of this group, $Q'$ and $T'$ are each —O— or —CO— and $s'$ and $t'$ are each 0, 1, 2 or 3.

In order to obtain products having a low melting point and at the same time a relatively high glass transition temperature, it is essential that one or more of the substituents $Ar^1$, $Ar^2$, $Ar^3$, $Ar^4$ and $Ar^5$ are biphenylene or naphthylene groups.

A plurality of biphenylene or naphthylene groups may of course also be present.

Including these groups in the amounts stated gives products which, in comparison with polyaryl ether ketones without these units, have lower melting points and virtually unchanged or even slightly increased glass transition temperatures. Compared with polyaryl ether ketones derived exclusively from repeating units having biphenylene or naphthylene groups, the novel products have substantially lower melting points without the glass transition temperature being significantly lower.

Preferred polyaryl ether ketones are those where, in the general formula II, both substituents $Q'$ and $T'$ are —CO— groups and those in which the repeating units of the general formula II have the following structure

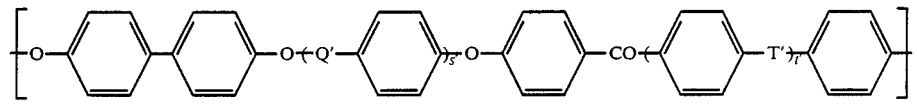

where the aromatic rings may be substituted by $C_1$–$C_6$-alkyl, $C_1$–$C_6$-alkoxy, aryl, chlorine or fluorine and $Q'$, $T'$, $s'$ and $t'$ have the meanings stated in claim 1.

The units stated below are typical examples of repeating units of the general formula II:

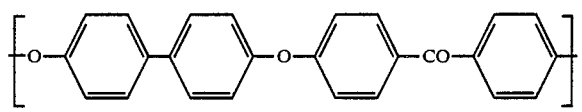
(II1)

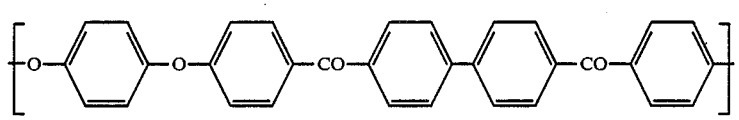
(II2)

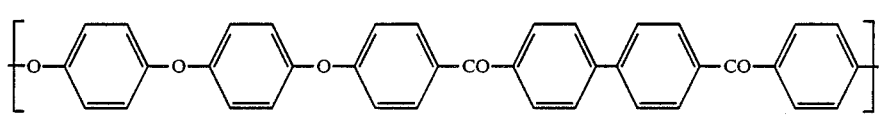
(II3)

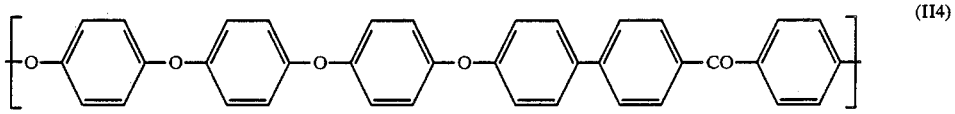

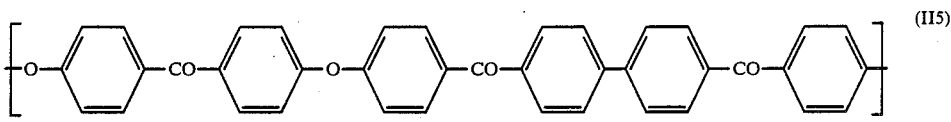

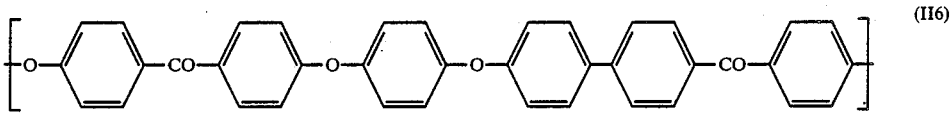

When combining repeating units of the general formulae I and II, it must also be ensured that all parameters s, t, s' and t' are not simultaneously 0, since the resulting products are not completely satisfactory with regard to the glass transition temperature (in this context, see the introduction of EP-A No. 184 458).

The following monomers can be used for the preparation of repeating units of the general formulae I and II by the nucleophilic preparation method, by polycondensation of dihydroxy compounds with dihalogen compounds:

| Formula | Name |
|---|---|
| HO—⟨⟩—OH | Hydroquinone |
| HO—⟨⟩—⟨⟩—OH | 4,4'-dihydroxydiphenyl |
| HO—⟨⟩—CO—⟨⟩—OH | 4,4'-dihydroxybenzophenone |
| HO—⟨⟩—O—⟨⟩—OH | 4,4'-dihydroxydiphenyl ether |
| HO—⟨⟩—O—⟨⟩—O—⟨⟩—OH | |
| Cl,F—⟨⟩—CO—⟨⟩—F,Cl | 4,4'-difluorobenzophenone |
| Cl,F—⟨⟩—CO—⟨⟩—CO—⟨⟩—F,Cl | 1,4-bis-(4-fluorobenzoyl)-benzene |
| Cl,F—⟨⟩—CO—⟨⟩—⟨⟩—CO—⟨⟩—F,Cl | 4,4'-bis-(p-fluorobenzoyl)-biphenyl |

-continued

| Formula | Name |
|---|---|
| Cl,F—⟨ ⟩—O—⟨ ⟩—⟨ ⟩—CO—⟨ ⟩—F,Cl | 4-(p-fluorophenoxy)-4'-(p-fluorobenzoyl)-biphenyl |

As stated above, the repeating units of the general formula II may contain naphthylene groups instead of the biphenylene groups. Some monomers for introducing such naphthylene groups into the repeating units of the general formula II are therefore shown below.

| Formula | Name |
|---|---|
| (naphthalene with OH at 1 and 5 positions) | 1,5-dihydroxynaphthalene |
| (naphthalene with OH at 2 and 6 positions) | 2,6-dihydroxynaphthalene |
| (naphthalene with OH at 2 and 7 positions) | 2,7-dihydroxynaphthalene |
| HO—⟨ ⟩—CO—(naphthalene)—CO—⟨ ⟩—OH | 2,6- or 2,7-bis-(p-hydroxybenzoyl)-naphthalene |
| Cl,F—⟨ ⟩—CO—(naphthalene)—CO—⟨ ⟩—F,Cl | 2,5- or 2,7-bis-(p-fluorobenzoyl)-naphthalene |

The abovementioned monomers are only a selection of the monomers which can be used in the nucleophilic preparation.

If necessary, further monomers which contain —S—, —SO$_2$— or imide bridging members may be concomitantly used, in amounts of not more than 10 mol %.

The repeating units of the general formulae I and II can be incorporated in the novel polyaryl ether ketones either randomly or in the form of blocks.

Random incorporation is obtained simply by adding all monomers at the same time, while a block structure is obtained by adding the monomers of the individual blocks at different times.

The weight average molecular weight of the novel polyaryl ether ketones is in general from 10,000 to 150,000, preferably from 15,000 to 100,000, in particular from 18,000 to 80,000.

If the repeating units of the general formulae I and II are arranged in the form of blocks, the molecular weight of these individual blocks is in general from 500 to 15,000, in particular from 1,500 to 10,000 (in this case too, the weight average molecular weights are meant).

The novel polyaryl ether ketones can also be mixed with other polyaryl ether ketones and/or polyaryl ether sulfones and/or liquid crystalline polymers. Blends containing from 10–90% by weight of a polyarylether ketone of the invention may thus be prepared by blending therewith from 10–90% by weight of a different polyarylether ketone, a polyarylether sulfones and or a liquid crystalline polymer.

Furthermore, fillers, pigments and conventional processing assistants may also be added.

Examples of reinforcing fillers are asbestos, carbon fibers and preferably glass fibers, the glass fibers being used, for example, in the form of woven glass fabrics, glass mats, glass surface mats and/or preferably glass rovings or chopped glass strands of low-alkali E glasses, having a diameter of from 5 to 20 μm, preferably from 8 to 15 μm. After they have been incorporated, they generally have a mean length of from 0.05 to 1, preferably from 0.1 to 0.5, mm.

Polyaryl ether ketones reinforced with glass rovings or chopped glass strands contain in general from 10 to 60, preferably from 20 to 50, % by weight, based on the total weight, of the reinforcing agent, while the impregnated glass fabrics, glass mats and/or glass surface mats contain from 10 to 80, preferably from 30 to 60, % by weight, based on the total weight of filler and polyaryl ether ketone, of polyaryl ether ketones.

Other suitable fillers are wollastonite, wollastocup, calcium carbonate, glass spheres, powdered quartz and boron nitride, or mixtures of these, which are added, as a rule, in amounts of from 10 to 50% by weight.

Typical examples of pigments in this case are titanium dioxide, cadmium sulfide, zinc sulfide, barium sulfate and carbon black.

Additives and assistants are, for example, dyes, lubricants (polytetrafluoroethylene, graphite or molybdenum disulfide), abrasives (eg. carborundum), light stabilizers and hydrolysis stabilizers, whose amount is in general from 0.01 to 10% by weight, based on the total weight of the polyaryl ether ketones.

As stated above, the novel polyaryl ether ketones can be prepared by either a nucleophilic method or an electrophilic method.

For preparation by the nucleophilic method, it is possible in principle to use the process described in EP-A 1 879, so that further information is unnecessary here.

The reaction in aprotic polar solvents in the presence of anhydrous alkali metal carbonates as bases is particularly suitable. A particularly preferred combination in this respect is diphenyl sulfone as the solvent and $K_2CO_3$ as the base.

The amount of diphenyl sulfone is in general from 5 to 100, preferably from 5 to 20, moles per mole of monomers. This gives a preferred solids content of the reaction solution of from 5 to 50, particularly preferably from 10 to 40, % by weight.

The water formed during the polycondensation can be removed with the aid of an azeotrope former, by reducing the pressure or, preferably, by passing in a stream of nitrogen and carrying out distillation.

Suitable azeotrope formers are all compounds which boil in the region of the reaction temperature under atmospheric pressure and can be mixed homogeneously with the reaction mixture without undergoing chemical reactions. The reaction temperature is in general from 150° to 400° C., preferably from 250° to 400° C., in particular from 250° to 350° C.; the total reaction time depends on the desired degree of condensation and is in general from 0.1 to 15 hours.

After the polycondensation, the product can be reacted with an arylating or alkylating agent, such as 4-fluorobenzophenone or methyl chloride, in order to stabilize free terminal phenolate groups. This reaction is preferably carried out at up to 350° C., the lower temperature limit being determined by the solubility of the polyaryl ether ketone in the solvent used.

The reaction products can be worked up by conventional methods known per se. Advantageously, the melt is converted into a finely divided material, which is freed from the reaction solvent (eg. diphenyl sulfone) by extraction with a suitable solvent (eg. acetone). Residues of alkali metal carbonates and fluorides can then be removed by extraction with water.

The conditions for the preparation by the electrophilic method according to the known Friedel-Crafts acylation are described in, for example, EP-A Nos. 124 276, 138 990 or U.S. Pat. No. 3,956,240.

In the electrophilic preparation, monomers having carboxyl or carboxyl derivative groups are, as a rule, reacted with monomers which contain activated hydrogen atoms, in the presence of a catalyst in a solvent.

The type and amount of catalysts and solvents are described in the abovementioned EP-A Nos. 124 276, 138 990 and U.S. Pat. No. 3,956,240, so that further information is unnecessary here.

The novel polyaryl ether ketones have good heat distortion resistance and at the same time (because of their relatively low melting point) good processibility by a thermoplastic method via the melt.

Because of this property spectrum, the novel polyaryl ether ketones can advantageously be processed to give moldings and, in particular, substrates for electronic and electrical components.

EXAMPLE 1

28.95 g of 1,4-bis-(p-fluorobenzoyl)-benzene, 16.67 g of 4,4'-dihydroxybiphenyl, 13.7 g of potassium carbonate and 0.036 g of 4-fluorobenzophenone in 600 g of diphenyl sulfone were reacted under nitrogen using the following temperature program:

1 hour at 180° C.

1 hour at 200° C.

1 hour at 240° C.

1 hour at 320° C.

2 hours at 330° C.

Thereafter, the melt was placed on a metal sheet, cooled and then comminuted. The product obtained was then extracted 5 times with warm acetone and 5 times with hot water and then dried at 200° C.

EXAMPLE 2

57.9 g of 1,4-bis-(p-fluorobenzoyl)-benzene, 20.04 g of hydroquinone, 27.4 g of potassium carbonate and 0.072 g of 4-fluorobenzophenone in 600 g of diphenyl sulfone were reacted under nitrogen using the following temperature program:

1 hour at 180° C.

1 hour at 240° C.

1 hour at 280° C.

1 hour at 300° C.

1 hour at 320° C.

Working up was carried out as described in Example 1.

EXAMPLE 3

57.9 g of 1,4-bis-(p-fluorobenzoyl)-benzene, 10 g of 4,4-dihydroxybiphenyl, 13.8 g of hydroquinone, 27.4 g of potassium carbonate and 0.072 g of 4-fluorobenzophenone in 600 g of diphenyl sulfone were reacted using the temperature program described in Example 2.

The product obtained was worked up as described in Example 1.

EXAMPLES 4 TO 7

1,4-bis-(p-fluorobenzoyl)-benzene, 4,4'-dihydroxybiphenyl and hydroquinone were condensed in the molar ratios stated in the Table, by the procedure described in Example 3. The amount of 1,4-bis-(p-fluorobenzoyl)-benzene used was the same as that in Example 3.

Working up was carried out as described in Example 1.

The Table below shows the molar ratios of hydroquinone and dihydroxybiphenyl which were used in the individual Examples, and the glass transition temperature, the melting point and the intrinsic viscosity of the resulting products. The intrinsic viscosity was determined in 0.5% strength solution in concentrated $H_2SO_4$.

TABLE

| Example No. | Molar ratio | | Glass transition temperature °C. | Melting point °C. | IV (0.5% strength in conc. $H_2SO_4$) |
|---|---|---|---|---|---|
| | Hydroquinone (mol %) | 4,4'-DHB (mol %) | | | |
| 1V | 0 | 100 | 183 | 424 | 0.61 |
| 2V | 100 | 0 | 165 | 365 | 0.88 |
| 3 | 70 | 30 | 170 | 330 | 0.95 |
| 4 | 95 | 5 | 168 | 359 | 0.89 |
| 5 | 90 | 10 | 168 | 355 | 0.86 |
| 6 | 85 | 15 | 166 | 350 | 0.81 |
| 7V | 30 | 70 | 170 | 421 | 0.63 |

V = Comparative Example

EXAMPLE 8

(Electrophilic process)

60 ml of dry dichloromethane were initially taken in a 500 ml three-necked flask provided with a stirrer, a nitrogen inlet and an internal thermometer.

The flask was flushed with nitrogen and was kept under nitrogen during the entire synthesis. The content of the flask was cooled to −27° C., and anhydrous aluminum chloride (35.36 g, 265.2 mmol) was introduced via a powder funnel. N,N-dimethylformamide (11.08 g, 151.6 mole, freshly distilled over calcium hydride) in methylene chloride (30 ml) was added to the suspension thus obtained, the addition being carried out slowly owing to the considerable evolution of heat. A solution of 4,4'-diphenoxybenzene (10.856 g, 41.4 mmol), 4,4'-diphenoxybiphenyl (3.424 g, 10.12 mmol), terephthaloyl chloride (10.272 g, 50.6 mmol) and benzoyl chloride (0.2134 g, 1.52 mmol) in methylene chloride (100 ml) was added, with further cooling. The vessels used for weighing out the amounts were washed with an additional 20 ml of methylene chloride in order to ensure complete transfer of the monomers. The stirred reaction mass was warmed up to room temperature in the course of about 6 hours. During this time, a viscous reddish orange suspension formed and solidified to a porous foam. The gel-like mass was removed mechanically from the flask, comminuted beforehand by cutting with a knife, and comminuted in a household mixer together with ice water and decomplexed. The resulting suspension of white polymer particles in water was stirred for about 30 minutes in a mixer and then filtered. The polymer thus obtained was extracted with three times 1,000 ml of boiling water (6 hours).

After drying under reduced pressure (100° C., 18 hours), a polymer having an intrinsic viscosity of 1.02 (measured in concentrated sulfuric acid at 25° C., 0.5 g/100 ml) was obtained. The polymer thus obtained had a glass transition temperature of 163° C. and a melting point of 344° C.

We claim:

1. A polyaryl ether ketone essentially consisting of
   (A) 55-95 mol % of repeating units of the formula I

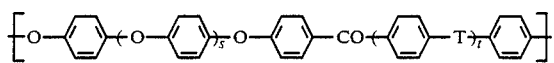

where s and t are each 0, 1, 2 or 3 and Q and T are each —O— or —CO—, or their $C_1$-$C_6$-alkyl, $C_1$-$C_6$-alkoxy, aryl, chlorine or fluorine derivatives substituted in the nucleus, and (B) 5-45 mol % of repeating units of the formula II

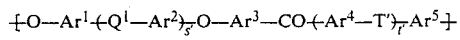

where $Ar^1$, $Ar^2$, $Ar^3$, $Ar^4$ and $Ar^5$ independently of one another are each a phenylene, biphenylene or naphthylene group or a $C_1$-$C_6$-alkyl, $C_1$-$C_6$-alkoxy, aryl, chlorine or fluorine derivative of this group, Q' and T' are each —O— or —CO— and s' and t' are each 0, 1, 2 or 3, with the proviso that one or more of the groups $Ar^1$, $Ar^2$, $Ar^3$, $Ar^4$ and $Ar^5$ are a biphenylene or naphthylene group or a $C_1$-$C_6$-alkyl, $C_1$-$C_6$-alkoxy, aryl, chlorine or fluorine derivative of such a group and, if $Ar^1$ is a biphenylene group, all parameters s, t, s' and t' are not simultaneously 0.

2. A polyaryl ether ketone as claimed in claim 1, essentially consisting of
   (A) 65-90 mol % of repeating units of the formula I and
   (B) 10-35 mol % of repeating units of the formula II.

3. A polyaryl ether ketone as claimed in claim 1, wherein, in the formula I, Q and T are each —CO—.

4. A polyaryl ether ketone as claimed in claim 1, wherein, in the formula II, Q' and T' are each —CO—.

5. A polyaryl ether ketone as claimed in claim 1, which essentially consists of
   (A) 55-95 mol % of repeating units of the formula

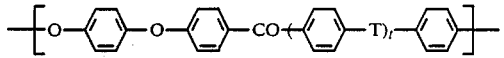

where the aromatic rings may be substituted by $C_1$-$C_6$-alkyl, $C_1$-$C_6$-alkoxy, aryl, chlorine or fluorine and T and t have the meanings stated in claim 1, and
   (B) 5-45 mol % of repeating units of the formula

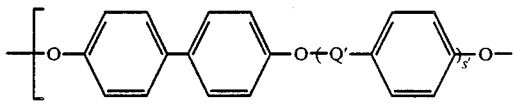

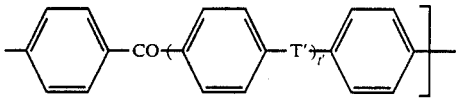

where the aromatic rings may be substituted by $C_1$–$C_6$-alkyl, $C_1$–$C_6$-alkoxy, aryl, chlorine or fluorine and Q′, T′, s′ and t′ have the meanings stated in claim 1.

6. A blend containing from 10 to 90% by weight of a polyaryl ether ketone as claimed in one or more of claims 1 to 5 and from 10 to 90% by weight of a polyaryl ether ketone which differs from the said polyaryl ether ketone.

7. A blend containing from 10 to 90% by weight of a polyaryl ether ketone as claimed in one or more of claims 1 to 5 and from 10 to 90% by weight of a polyaryl ether sulfone.

8. A blend containing from 10 to 90% by weight of a polyaryl ether ketone as claimed in one or more of claims 1 to 5 and from 10 to 90% by weight of a liquid crystalline polymer.

* * * * *